Jan. 30, 1968    R. G. LE TOURNEAU    3,366,192
PERAMBULATORY VEHICLE

Filed June 20, 1966    2 Sheets-Sheet 1

INVENTOR.
Robert G. LeTourneau
BY Wm. T. Wofford
Attorney

Jan. 30, 1968  R. G. LE TOURNEAU  3,366,192
PERAMBULATORY VEHICLE

Filed June 20, 1966  2 Sheets-Sheet 2

INVENTOR.
Robert G. Le Tourneau
BY Wm. T. Wofford
Attorney

United States Patent Office 3,366,192
Patented Jan. 30, 1968

3,366,192
PERAMBULATORY VEHICLE
Robert G. LeTourneau, P.O. Box 2307,
Longview, Tex. 75601
Filed June 20, 1966, Ser. No. 559,684
1 Claim. (Cl. 180—8)

ABSTRACT OF THE DISCLOSURE

A perambulatory vehicle has a main body or frame portion having auxiliary body or foot portions disposed in juxtaposed relation on opposite sides thereof. A system of powered cranks produces orbital movement of the foot portions relative to the main body portion to propel the vehicle.

My invention relates to perambulatory vehicles and particularly to such vehicles embodying improved means for clearing the ground of brush and timber.

The general object of my invention is to provide improved perambulatory vehicles.

Another object of my invention is to provide perambulatory vehicles utilized as land clearing machines in which a substantially vertical crushing action is generated by the land clearing implements.

These and other objects of my invention will be apparent from the following description taken in accordance with the accompanying drawings, in which.

Figure 1:
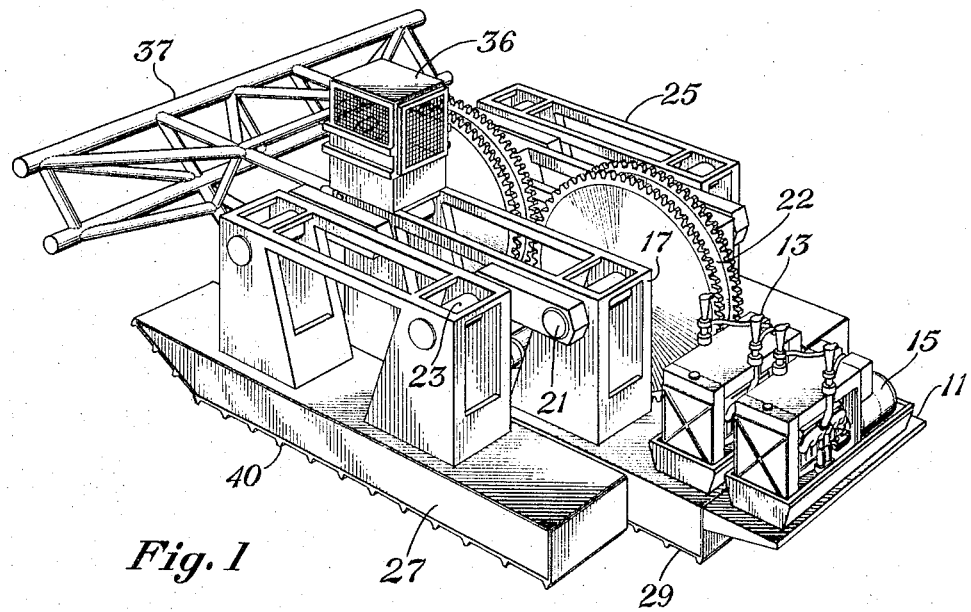
FIG. 1 is a perspective view of a land clearing machine constructed in accordance with the principles of my invention.

The perambulatory vehicle illustrated in the drawings is a land clearing machine and has a main frame 11 that supports internal combustion engines 13 for supplying rotational movement to electric generators 15. The frame 11 includes two interconnected, vertical support structures 17 to which are secured two oppositely positioned pairs of cranks 19 that rotate about horizontal axes on respective sides of the frame defined by shafts 21. The shafts 21 are oriented so that there are two pair of coaxially aligned shafts. On the interior ends of each pair of shafts, and between the vertical support structures 17, are mounted bull gears 22. The cranks 19 on each side of the vertical support structures 17 are aligned so that they normally rotate in phase with each other.

Figure 2:
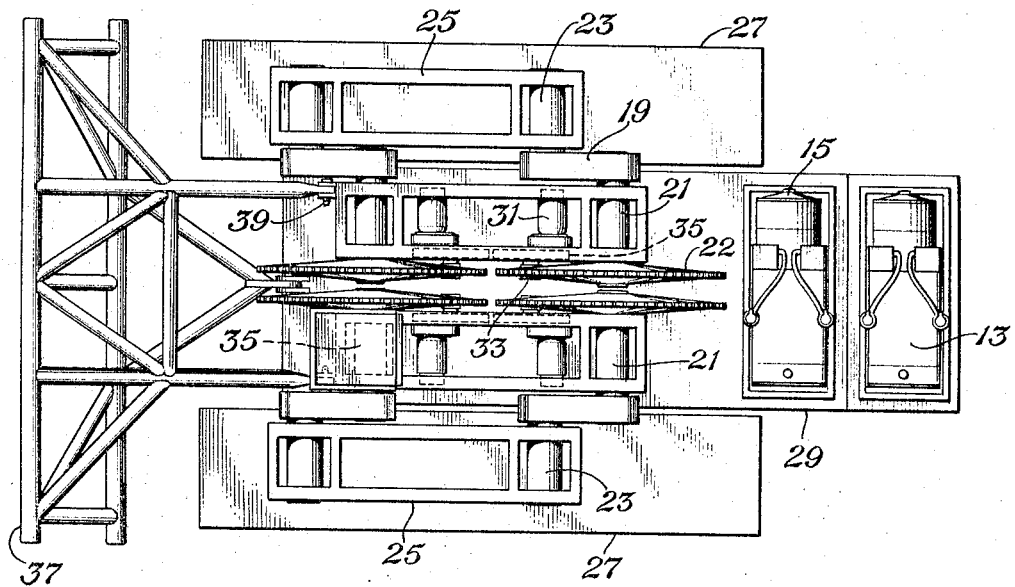
FIG. 2 is a plan view of the machine shown in FIG. 1.
Figure 3:
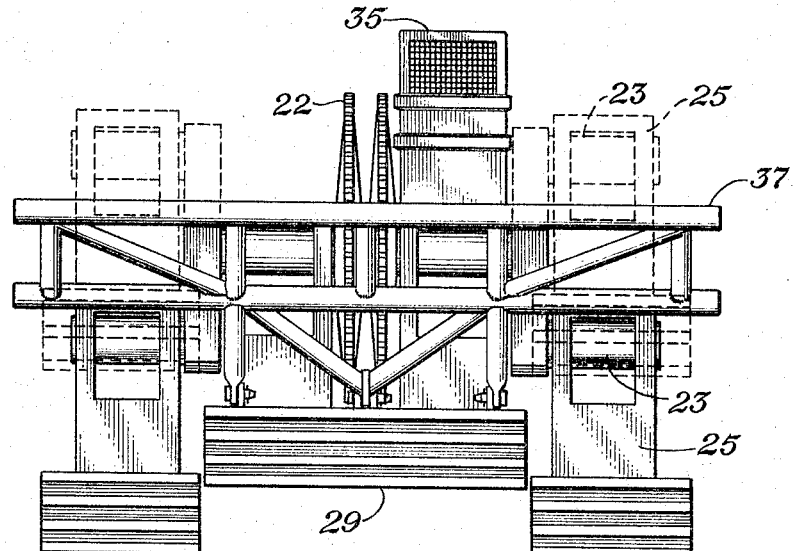
FIG. 3 and FIG. 4 are respectively front and side elevational views that demonstrate the manner of operation of the land clearing implements, which also serves as the propulsion means for the machine.

Extending outwardly from the cranks 19 are arms 23 which rotatably engage a second set of support structures 25 that are rigidly secured to movable regions or feet 27. The frame 11 has a configuration such that its lowermost surface forms a relatively stationary region or foot 29, as may be seen in FIGS. 1 and 3. To provide rotational movement to the cranks, electric gear motor units 31 (see FIG. 2) are secured to the frame 11 and rotate pinions 33 through suitable reduction means 35. The electric gear motor units receive power from the generators via conventional means (not shown). The pinions 33 rotatably engage the bull gears and rotate them when the electric motor units 31 are engaged. An operator's control station 36 is included on the machine at a location that permits good visibility and, therefore, good control. Extending from the forward end of the machine is a pusher assembly 37 that is mounted by suitable means, such as the pins 39, to the frame 11. The purpose of this pusher means is to engage and help topple timber or brush.

On the bottom of each foot are preferably included a plurality of grousers 40, the purpose of which is to engage and help comminute the timber and brush that are encountered by the feet.

The electric control circuits and control means permit the movable feet 27 to move independently when desired. This permits one movable foot to be held stationary, while the other moves, so that the machine may be turned to the right or left.

Figure 4:
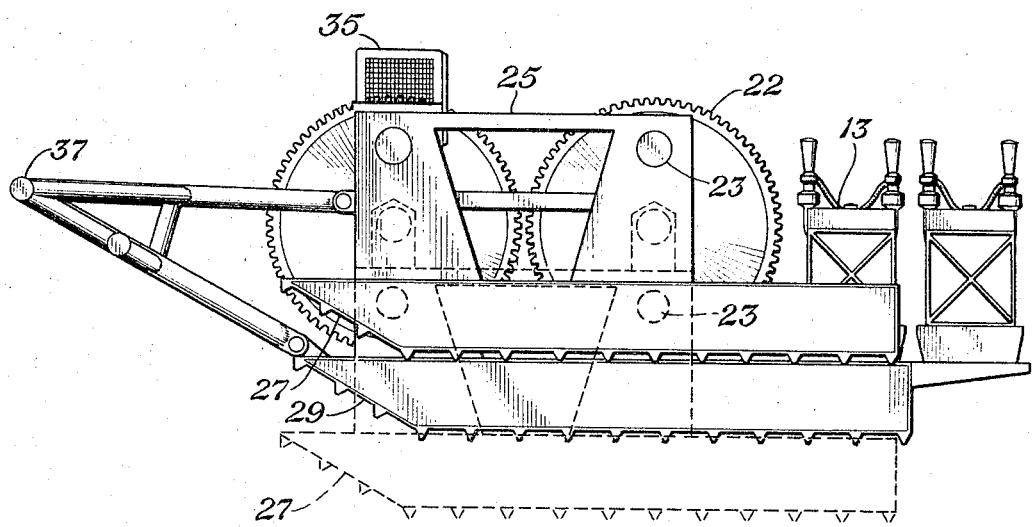

In operation, the internal combustion engines 13 are started and electric power is generated by the generators 15. To move the machine forward, electric circuit (not shown) between the generators 15 and the electric motors 13 is closed so that counterclockwise motion (as viewed in FIG. 1) is imparted to the bull gears 22 and to the cranks 19. This causes a circular or orbital motion of the movable feet 27. The lower surfaces of movable feet 27 extend below the lower surface of the relatively stationary foot 29 when the arms 23 rotate downward (see FIG. 3), and conversely, the lower surfaces of movable feet 27 rotate to a position above the lower surface of the relatively stationary foot 29 when the arms 23 of the cranks move upward (see FIG. 4). Therefore, a perambulatory movement is achieved by the machine since the downward rotating or orbital movements of the movable feet 27 periodically lift and move forward the main frame 11 and relatively stationary foot 29. The surface area of the feet is large enough so that the pressures exerted by the feet do not overcome the compressive strength of the ground.

It should be apparent from the foregoing that I have provided an invention having significant advantages.

The use of the above described movable and relatively stationary feet enables the provision of large surface areas for supporting the machine. The feet may be made quite long and wide, and thus the weight of the machine may be distributed over large enough areas so that the pressure exerted on the ground per square unit of area is small. This enables the machine to operate effectively in areas where there is large moisture content in the ground, such as in swampy regions.

Moreover, effective land clearing is achieved by the use of implements that have a vertical, crushing action on the timber and brush. The concept embodied in having one foot or region of the machine move downward or upward relative to another foot or region of the machine enables a crushing action that is effective in clearing land.

While I have shown my invention in only one form, it will be obvious to those skilled in the art that it is not so limited but is susceptible of various changes and modifications without departing from the spirit thereof.

I claim:
1. A perambulatory vehicle comprising:
    (a) a frame having a region with a ground engaging surface;
    (b) four cranks secured to said frame, with said cranks being arranged into two oppositely positioned pairs which are disposed on respective sides of said frame for rotation about parallel, horizontal shaft axes, said cranks each having an arm, with said arms disposed in mutually parallel relation and extending outwardly from said frame and parallel to said shaft axes;

(c) two movable feet that are rotatably secured respectively to the arms associated with a respective pair of cranks, each said foot having a ground engaging region that moves relative to said frame above and below the ground engaging surface of said frame region.

References Cited

UNITED STATES PATENTS

| | | |
|---|---|---|
| 961,809 | 6/1910 | Sherwood. |
| 1,306,644 | 6/1919 | Tibbits. |
| 2,164,120 | 6/1939 | Page. |
| 2,230,579 | 2/1941 | Page. |
| 2,633,782 | 4/1953 | Clement _____ 180—8 X |

LEO FRIAGLIA, *Primary Examiner.*